July 12, 1966 W. M. KAUFMAN ETAL 3,260,953

RESONATING AMPLIFIER

Filed May 23, 1962 2 Sheets-Sheet 1

WITNESSES

INVENTORS
William M. Kaufman and
Robert D. Haun, Jr.
BY
ATTORNEY

July 12, 1966 W. M. KAUFMAN ETAL 3,260,953

RESONATING AMPLIFIER

Filed May 23, 1962 2 Sheets-Sheet 2

3,260,953
Patented July 12, 1966

3,260,953

RESONATING AMPLIFIER

William M. Kaufman, Westfield, N.J., and Robert D. Haun, Jr., Pitcairn, Pa., assignors to Westinghouse Electric Corporation, East Pittsburgh, Pa., a corporation of Pennsylvania Filed May 23, 1962, Ser. No. 197,145
5 Claims. (Cl. 330—61)

This invention relates to a signal translation system and more particularly to a resonating amplifier similar to a so-called superregenerative amplifier and receiver. It is particularly directed to a resonating amplifier using a device having negative conductance, which is alternately switched into and out of circuit with a high frequency resonance, so that oscillation transients grow and decay in unison with the change in the conductance.

The invention is illustrated in connection with a tunnel diode, which is a two terminal device having a unique voltage-current characteristic, incorporated in circuitry for alternately establishing conditions for causing the growing and the quenching of transients of radio frequency oscillations. However, other devices having a negative conductance region in their transfer characteristic may be utilized in carrying out the basic concept of this invention.

Although superregenerative amplifiers are generally known, they are not widely used and it is appropriate to review the fundamentals of the so-called superregeneration method of amplification in order to facilitate the understanding of the present invention.

Superregeneration may be defined as a form of regenerative amplification resulting from varying conductance conditions in a regenerative system that produces periodic transients of growing and decaying oscillations. Another way of looking at it is that it is amplification in a circuit, including a tuned resonant circuit or other resonator, in which the real part of the impedance alternates between positive and negative values. The form of the envelope of the transient train of oscillations depends upon the voltage present as the transient oscillations start to build up, such as the instantaneous signal modulation voltage envelope impressed on a carrier. Rectification of the envelope of the transients of radio frequency oscillations will yield the modulation signal.

The active elements of such an amplifier are a resonant circuit and a variable conductance device, which conductance device is made to swing from positive to negative values to alternately establish oscillating and non-oscillating conditions. The transients of wave oscillations in the resonant circuit are excited by any voltage existing in the resonant circuit at the instant that the negative conductance is switched into the circuit. The transient train of oscillations begins to build up exponentially at the instant the circuit conductance becomes negative and begins to decay at the instant the conductance returns to a positive value, that is, the beginning of the quenching cycle. In the absence of an input signal, the transients will build up from the noise threshold voltage in the resonant circuit and decay to the noise threshold value. In the presence of a signal voltage, the transient train of oscillations will build up from the instantaneous amplitude of the envelope of the signal voltage and will continue to grow in amplitude exponentially until saturation, or until the next quench cycle begins, depending upon whether the amplifier is operating in the logarithmic mode or the linear mode. The oscillations then decay to the amplitude of the signal voltage and grow again from this value at the beginning of the next negative conductance cycle. Although the circuit of this general type of amplification was first disclosed by Armstrong in Patent No. 1,424,065 in 1922, the exact mechanism of the amplification action is not completely understood generally in the art. Specifically, it is not known at what instant the forced oscillation in the resonant circuit, excited by the voltage existing in the circuit, such as a signal voltage, changes to the free oscillation in the resonant circuit. Despite the fact that the present system works very similarly to circuits in the prior art called superregenerative, this term does not accurately describe the operation of the present invention.

The term superregenerative was first applied to this type of amplifier when the only means known to the art to provide a satisfactory negative conductance was an oscillating electron discharge device in which the resonant circuit was included in the input circuit of the device and the output of the device was coupled to the resonant circuit to obtain a regenerative action. Although the high gain factor was due to the inherent negative conductance, because of the high degree of amplification possible in the system and because of the regenerative action also inherent in the electron discharge tube oscillating circuits, the device was called a superregenerative amplifier. By utilizing the non-linear characteristic of the electron discharge device, the latter could also serve as a rectifier to recover a modulating signal voltage from a high frequency carrier voltage impressed upon the oscillating circuit and thus the term superregenerative detector was also coined. In such prior devices, the effective switching of the negative conductance into and out of the circuit with the resonant tank circuit was accomplished in more than one way known to the art for causing phase shift and feedback in electron discharge devices which in turn cause such devices to go into and out of oscillation.

Because of the genesis of the so-called superregenerative amplifier and detector, publications describing the operation of these receivers and amplifiers infer that the resonant circuit itself inherently has negative conductance when it is being driven in an oscillating condition by the electron discharge device. Here it should be noted that regardless of the mechanism by which the regenerator resonant circuit acquired its effective negative conductance it should be understood that this is a virtual negative conductance and not an actual negative conductance. It is the gain factor of the electron discharge device feeding a portion of its output into the input circuit that gives this virtual, or apparent, negative resistance. In other words, in the prior art devices the energy supplied to keep the electron discharge devices oscillating also supplies the energy losses in the oscillating circuit.

In accordance with the present invention, it has been found that amplifying action, similar to that which has been described in the prior art as superregeneration, can be obtained by providing a device having negative conductance independently of the resonant circuit. By periodically varying the conductance from positive to negative values amplification is obtained without any regenerative action, in the sense referred to in the prior art devices.

The present invention provides means for effectively switching in a novel manner the device having negative conductance into and out of the circuit with the resonant tank circuit. Preferably, the present invention utilizes a device, the conductance of which is voltage responsive to change its value from positive to negative values. A particular embodiment takes the form of a circuit configuration in which the negative conductance device, a tunnel diode, is included simultaneously in a relaxation oscillator circuit and a radio frequency resonating circuit with the output voltage of the relaxation oscillator swinging the bias voltage on the tunnel diode to cause the radio frequency circuit to go into and out of oscillation.

Accordingly, a main object of the present invention is to provide a novel and improved resonating amplifier and signal translation device of the type referred to above.

A further object is to provide a novel and improved amplifier of the type mentioned in which a device having a negative conductance is effectively, alternately, switched into and out of the circuit with a passive resonator to excite alternately growing trains of high frequency oscillations and to quench the high frequency oscillation.

Another object is to provide a novel and improved amplifier of the type mentioned in which a device having a voltage responsive conductance, having positive and negative regions, is used for generating the switch or quench frequency for causing the device to be biased alternately in its positive and negative conductance regions.

A still further object is to provide a novel and improved resonating amplifier of the type described in which a tunnel diode is used in a novel circuit configuration whereby quench frequency voltage excursions are produced that alternately bias the diode in its positive and negative conductance regions for conditioning the resonating amplifier for oscillating and non-oscillating conditions.

The novel features that are considered characteristic of this invention are set forth with particularity in the appended claims. The above-mentioned and other objects, as well as the invention itself, both as to its organization and method of operation will best be understood from the following description when taken in connection with the accompanying drawings, in which:

Figure 1:
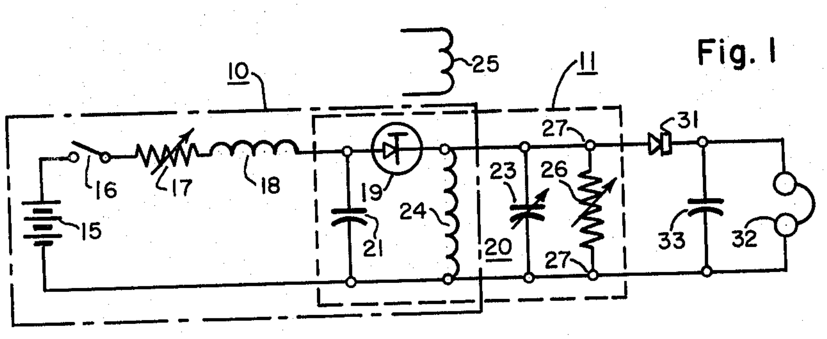
FIGURE 1 is a circuit diagram of an embodiment of the present invention.

In the preferred embodiment, the invention is illustrated in connection with a two terminal tunel diode, since the latter has a unique voltage-responsive conductance characteristic. Since the tunnel diode is small, simple and compact it especially lends itself to the objectives of the inventive concept of the present invention in a simple and economical manner. Also, since the tunnel diode is a two-terminal device and because it has two positive conductance regions separated by a negative conductance region and requires a very low voltage power supply, it readily lends itself to serving as the oscillator element in the quench frequency oscillator while at the same time providing the negative conductance for the high frequency resonating amplifier circuit. It is to be understood, of course, that the present invention is not limited solely to the use of a tunnel diode. The broadest phases of the invention may be carried out by any device which provides a suitable negative characteristic region in its voltage current curve in accordance with the teachings set forth herein.

As illustrated in the drawings, a tunnel diode is arranged in circuit configurations that cause the bias on the tunnel diode to oscillate between values for alternately biasing the diode in its positive and negative conductance regions, thus alternately supporting and quenching oscillations in the high frequency resonant tank circuit connected therewith. The quench frequency oscillations can be readily controlled over a wide range by choice of the value of inductance, the diode shunt capacitance and the series resistance.

The tunnel diode is a relatively new member of the semiconductor family. The functional aspects of this particular type of semiconductor device may be characterized briefly, as a device which exhibits a voltage-responsive conductance characteristic including two positive conductance regions separated by a negative conductance region. One of the important features of this device, as regards this invention, is that it is a two terminal device, and therefore it lends itself to simple and flexible circuit design. The tunnel diode was first described in a 1958 issue of the Physical Review, volume No. 109, page 103, in an article entitled "New Phenomena in Narrow Germanium P-N Junctions." A simplified description of the device appears in Electronics World for March 1961 at pages 44, 45, 46 and 100. In addition to the references listed in the bibliography at the end of that article, numerous other articles, including Electronics for November 6, 1959, pages 54, 55, 56 and 57 and Electronics for February 10, 1961, pages 68, 69, 70 and 72 discuss and give characteristics and application of the tunnel diode. The basic operational characteristics for the purpose of a clear understanding of the present invention are illustrated by certain of the graphs of the drawings, as hereinafter pointed out.

Referring to the circuit configuration of FIG. 1, the circuit for the quench frequency oscillator is included in the dot-dash line block 10 while the dotted line block 11 includes the circuit for the high frequency resonator circuit. It will be noted that certain elements or components of the circuit are common to both of these blocks.

Figure 2:
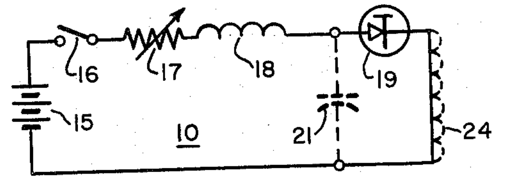
FIG. 2 is a circuit representing the electrical equivalent of the quench frequency oscillator portion of the circuit of FIG. 1.
Figure 3:
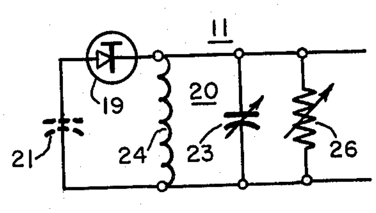
FIG. 3 is a circuit representing the electrical circuit equivalent of the high frequency resonator portion of the circuit of FIG. 1.

For purposes of simplicity and analysis, the electrical equivalent of the quench frequency oscillator circuit of block 10 is shown in FIG. 2 while the electrical equivalent of the high frequency oscillator of block 11 is shown separately in FIG. 3. The quench frequency oscillator circuit includes a source of biasing voltage represented by the battery 15, a switch 16, a resistor 17, an inductance 18 and a tunnel diode 19 connected in a direct current series circuit. The resistor 17, preferably, should be variable so as to provide suitable adjustment for the bias voltage on the diode 19. The condenser 21 forms no part of the quench frequency oscillator circuit. The inductance 24 has no function in the quench frequency oscillator circuit other than to complete the direct current circuit path. The quench frequency oscillator circuit, using the tunnel diode 19, constitutes a simple relaxation oscillator. However, as will be noted later, because of the current-voltage characteristics of the diode 19 an unusual voltage waveform is developed which produces excursions in the bias voltage in such a manner as to switch the diode through its positive and negative conductance regions at a very high rate. These excursions of the bias voltage, effectively, switch the negative conductance of the diode into and out of circuit with the resonator tank circuit 20. A transient train of radio frequency oscillations begins to grow in the resonant tank circuit 20 as soon as the diode 19 is switched into its negative conductance region and the oscillations begin to decay at the instant that the diode is switched into its positive conductance regions.

The resonant frequency of the radio frequency tank circuit 20, comprising the condenser 23 and the inductance 24, is preferably much higher than the frequency of the quench frequency oscillator and for this reason the condenser 23 and the inductance 24 can be ignored as far as the operation of the relaxation oscillator is concerned. As will be seen later, the size of the capacitor 23 is so chosen that it serves to complete the circuit for the radio frequency resonator circuit 20, which includes the tunnel diode 19, but the impedance of capacitor 23 is so high to the low quench frequency as to have no effect on the relaxation oscillator.

The parameters of the relaxation oscillator circuit are chosen in accordance with well known principles so as to provide a desired quench frequency for the radio frequency tank circuit 20 to give desired operation in the novel circuit configuration of this invention. The basic principles governing the desired quench frequency are the same as those known and understood in the art relating to the so-called superregenerative amplifiers. The frequency at which the radio frequency oscillations build up and decay should be very low as compared to the frequency of the radio frequency oscillator, but on the other hand should be, in general, at least twice as high as any signal frequency which might be encountered by the system. However, since, the tunnel diode 19 has two positive conductance regions separated by the negative conductance region, if the voltage excursions of the relaxation oscillator embrace all three regions two transient trains of radio frequency oscillations will occur in tank circuit 20 for each cycle of the relaxation oscillator. Under such conditions the parameters would be so chosen or adjusted so as to make the frequency of the relaxation oscillator of block 10 one half of the desired frequency as it is known in the so-called superregenerative amplifier.

As will be seen, as the description proceeds, the parameters of the relaxation oscillator circuit can be so chosen as to limit the amplitude excursion of the voltage developed in the relaxation oscillator circuit so that it does not not swing entirely through the negative conductance region of the diode 19. Under this condition there is only one burst of radio frequency oscillations in tank circuit 20 per cycle of the relaxation oscillator and the circuit parameters will also be so chosen or adjusted so that the frequency of the relaxation oscillator is twice what it would be under the circumstances previously mentioned, that is, the frequency would be the same as the desired quench frequency in a comparable so-called superregenerative receiver.

The radio frequency tank circuit 20 constitutes the second basic active element of the present invention, the first active element being the tunnel diode 19. This combination, illustrated specifically in the configuration in FIG. 3 will oscillate if the diode 19 is biased to operate within its negative conductance region II, illustrated in FIG. 4, when $di/dv = -G$. Under this condition, the positive conductance is exactly canceled by the negative conductance of the diode and the conditions for periodic harmonic oscillations will be established. If $dI/dv < -G$ the conditions for oscillation do not exist and the oscillations in the circuit will decay.

In order to provide for some flexibility in operating conditions, a suitable resistor 26 is connected in shunt to the tank circuit 20 and across output terminals 27 and the value of its resistance is so chosen in relation to the conductance of the diode 19 as to establish the radio frequency oscillating conditions. Preferably, the resistor 26 is variable so as to make the positive component of resistance of the radio frequency circuit adjustable and hence control the gain. The direct current source of biasing voltage for the diode 19 is not shown in FIGURE 3 for reasons of simplicity. The value of the capacitor 21 is so chosen at to have substantially negligible impedance at the resonant frequency of the tank circuit 20 and, accordingly, it serves to complete the high frequency oscillating circuit through the diode 19 while the radio frequency inductance 24 serves to complete the direct current path through the diode 19. It will also be apparent that the inductance 18 in the relaxation oscillator configuration of block 10 serves to isolate the radio frequency oscillations from the relaxation oscillator circuit of block 10.

Although it should be apparent to one skilled in the art from the description so far given how the circuit of FIG. 1 operates, a review of the operation may be in order. As is well understood, if the negative conductance of a suitable generator connected across the terminals of a resonant circuit is less than the equivalent shunt impedance across the resonant circuit, the latter will be excited into oscillation by any voltage appearing across the terminals of the resonating circuit. Because of the negative conductance in one portion of the forward characteristics of a tunnel diode, it may constitute a signal generator and because its conductance is voltage-responsive, such a diode may be used to, effectively, switch the negative conductance into and out of circuit with the tank circuit 20 so that the conditions for oscillation in the tank circuit are alternately and abruptly established and withdrawn. This action is summarily illustrated in the greatly enlarged graph of FIG. 7.

Figure 4:
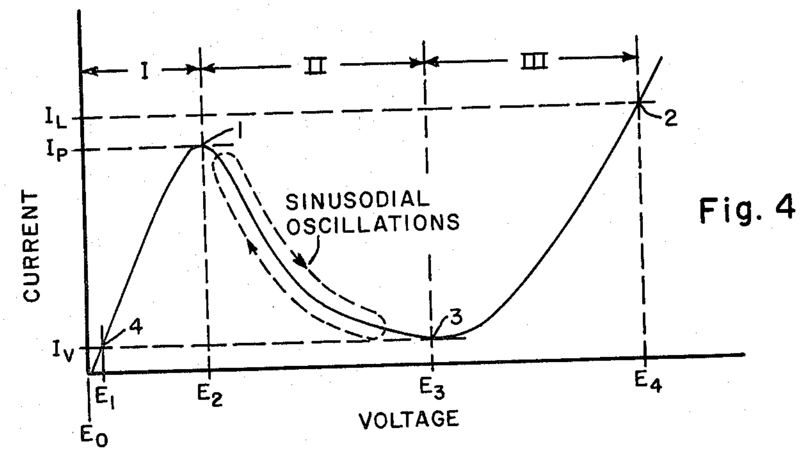
FIG. 4 illustrates the static voltage-current characteristic of a typical tunnel diode.

Referring now to FIG. 4, the curve shows that the tunnel diode 19 has two positive conductance regions designated by I and III which are separated by a negative conductance region II. Thus, it will be seen that if the bias voltage on the diode 19 is varied from $E_0$ to $E_4$ the characteristic of the diode 19 must pass through the negative conductance region II and likewise if the bias voltage is changed back from $E_4$ to a point between $E_2$ and $E_0$.

It is the purpose of the relaxation oscillator circuit block 10 of FIGS. 1 and 2 to periodically swing the bias voltage on the tunnel diode 19 back and forth at the proper frequency from a point between $E_1$ and $E_2$ to at least a point between $E_2$ and $E_3$ in the negative conductance region II. When the bias voltage is within the negative conductance region II conditions will be established for radio frequency oscillations in the tank circuit 20. By adjustment of the relaxation oscillator the bias voltage excursions can be limited so that the voltage does not swing all the way through the negative conductance region II to thereby provide only one transient train of radio frequency oscillations per cycle of the relaxation oscillator. When the bias voltage swings beyond $E_3$, the dividing time between negative conductance region II and positive conductance region III, there will be two conditions for oscillation in the tank circuit 20 per cycle of the relaxation oscillator and therefore two transient bursts or trains of radio frequency oscillations per cycle of the relaxation oscillator. This is illustrated in FIG. 7.

Referring now to FIGS. 1 and 2, when the switch 16 is closed the current in the direct current path through the resistor 17, the inductance 18 and the tunnel diode 19 starts to build up toward some limiting value $I_L$, as indicated in FIG. 4. This limiting value $I_L$ is established by the difference between the battery voltage E and the voltage drop through the diode 19 in the first positive conductance region I of the diode characteristic curve and the other voltage drop in the circuit. If this value of current is greater than $I_p$, the peak current for the positive conductance region I, the instantaneous operating point of the diode 19 will jump to region III when the current reaches the value $I_p$, because the current cannot change instantaneously. Since the voltage across the diode 19 is now some high value, such as $E_4$, much greater than the voltage E the current tries to reverse and therefore must first reduce toward the value $I_v$, the valley current, corresponding to voltage $E_3$. As soon as the current goes below the value $I_v$, the instantaneous voltage operating point of the diode 19 will jump back to positive conductance region I and the current continues to diminish toward some value such as that corresponding to the voltage $E_1$. The current will then start to build up again to the point $I_p$ and the cycle will be repeated all over again. This cycle is the relaxation oscillation voltage cycle of the relaxation oscillator of block 10 and the time sequence, after the first cycle, may be indicated in the order 4, 1, 2, 3, 4 on the curve in FIGURE 4 while the corresponding conductance variation cycle may be indicated in the order 4, 1, 3, 2, 4, when the relaxation oscillator is adjusted to provide voltage excursions between $E_1$ and $E_4$. Between points 1 and 3 of the conductance variation cycle, corresponding to the rising and falling excursions of bias voltage on diode 19, the tank circuit 20 will produce transient trains of radio frequency oscillations as indicated in FIG. 7. If the relaxation oscillator voltage excursions no not rise above the point 3, that is, voltage $E_3$, there will be only one transient train of radio frequency oscillations in the tank circuit 20 per cycle of the relaxation oscillator.

Figure 5:
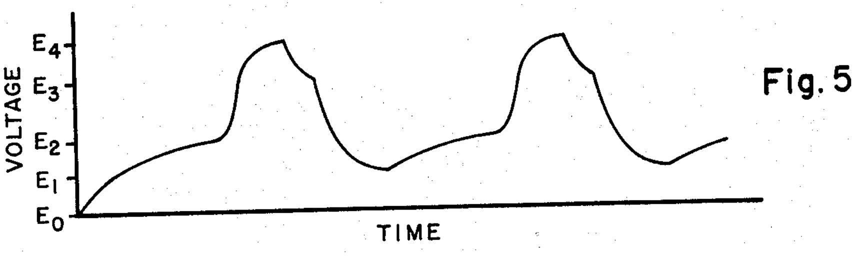
FIG. 5 illustrates, on an enlarged scale, the voltage, as a function of time, impressed on the tunnel diode resulting from the operation of the quench frequency oscillator portion of the circuit of FIG. 3.
Figure 6:
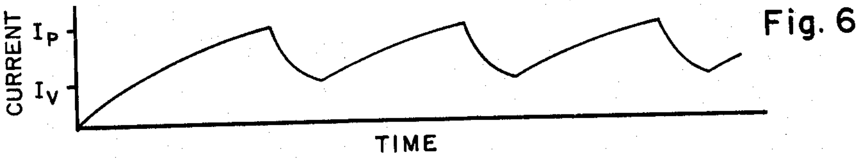
FIG. 6 illustrates, on an enlarged scale, the current, as a function of time, in the quench frequency oscillator portion of the circuit of FIG. 3.
Figure 7:
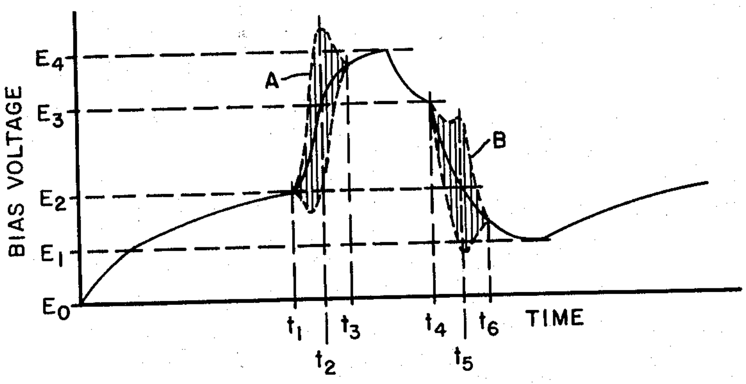
FIG. 7 is an enlarged representation of one cycle of the quench frequency oscillator upon which is superimposed the transient trains of the radio frequency oscillations.

Perhaps a better understanding of the circuit of the present invention will be obtained by reference to FIGS. 4, 5, 6 and 7. Starting again with the closing of the switch 16 the voltage across the diode 19 begins to rise from zero to the time $t_1$ when the current reaches the peak current $I_p$, indicated in FIGS. 4 and 6. This corresponds to point 1 on the static characteristic curve of the diode 19 in FIG. 4 and to the voltage $E_2$ across the diode indicated in all three FIGURES 4, 5 and 7. This point is also the dividing line between the positive conductance regions I and the negative conductance region II where the current begins to decrease as indicated in FIGS. 4 and 6. At this point, time $t_1$ on the operating cycle, the magnetic field of the inductance 18 begins to collapse and develops an induced voltage that rises toward a value $E_4$. Despite the high voltage $E_4$ the current continues to build down following the curve in FIGS. 4 and 6, although this action is so fast that for the general analysis, previously presented, it is considered that the operating point of the diode 19 has jumped instantaneously from $E_2$ to $E_4$. As the voltage excursion increases above $E_2$ toward $E_3$ from time $t_1$ to time $t_2$ the current continues to decrease but during this time interval the diode 19 is biased in the negative conductance region II. With the value of resistance 26 properly chosen so that $dI/dv$ at some point in region II is less than the negative conductance of the tank circuit 20, including the external resistor 26, a transient burst or train of radio frequency oscillations A begins to grow in the tank circuit 20 until time $t_2$ when the bias voltage reaches $E_3$ the end of the negative conductance region II. As the cycle continues the conductance variation cycle passes into the positive conductance region III where $dI/dv$ is less negative than the total conductance of the tank circuit 20 and the transient train of oscillations begins to decay to a point in time indicated at $t_3$ and to an amplitude equal to the amplitude of the signal voltage, if present, in the tank circuit 20. This is illustrated in the curve of FIG. 7 where it has been assumed, for simplicity, that there is not any signal or noise present in the tank circuit 20.

As the current again begins to increase beyond time $t_3$ through the positive conductance region III, the bias voltage on the diode 19 continues to rise to $E_4$ and then decrease to $E_3$. While the bias voltage on diode 12 is swinging from $E_3$ to $E_4$ and then back to $E_3$ non-oscillating conditions are maintained in the tank circuit 20 since the diode is biased in its positive conductance region. As the energy in the magnetic field of the inductance 18 is dissipated, the induced voltage rapidly decreases and the current decreases from point 2 to point 3 on the curve in FIG. 4 so that at time $t_4$ the tunnel diode 19 is again biased at a voltage below $E_3$ in the negative conductance region II. This again establishes oscillation conditions in the tank circuit 20 and a second transient train of radio frequency oscillations, indicated at B in FIG. 7, begins to grow to a maximum as the current continues to rise toward $I_p$ and as the voltage continues to decrease toward $E_2$. As the decreasing voltage reaches $E_2$ at time $t_5$, the conductance passes from the negative region II to the positive region I and the oscillations in the tank circuit begin to decay. At this point, the voltage, after the first cycle, goes, not to zero, but to the value $E_1$ thus completing the first cycle and starts to rise again and subsequent cycles are repeated with the voltage oscillating between $E_1$ and $E_4$.

Figure 8:
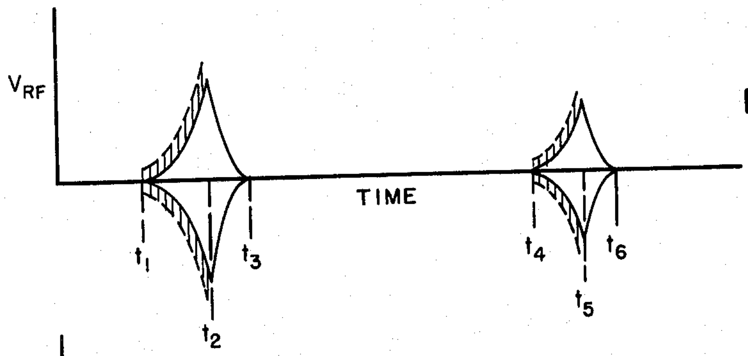
FIG. 8 is an enlarged representation of the transient trains of oscillations at the output terminals of the radio frequency oscillator portion of FIG. 1, when the resonating amplifier is operating in the linear mode.
Figure 9:
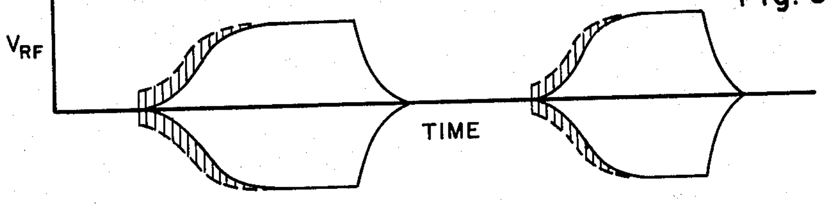
FIG. 9 is a graphical representation, similar to FIG. 8 when the resonating amplifier is operating in the logarithmic mode.

Since the inductance 24 of the tank circuit 20 presents substantially only a very low resistive impedance to the low frequency of the relaxation oscillator it smooths out the waveform shown in FIGS. 5 and 7 to give a waveform for the transient trains of radio frequency oscillations in the tank circuit 20, as shown in FIGS. 8 and 9, depending upon whether the amplifier is operating in the linear or the logarithmic mode.

The description of the operation given above applies to the situation where the parameters of the relaxation oscillator are so chosen as to provide voltage excursions beyond the negative conductance region II of the characteristic curve of the diode 19. As previously mentioned, the value of the resistor 17 can be so chosen in relation to the total capacitance of the circuit, including the internal capacitance of the diode, so that the voltage excursions embrace only conductance regions I and II and under these conditions only one transient train of oscillations will occur per cycle of the relaxation oscillator as the bias voltage on the diode 19 briefly extends into and returns from the negative conductance region II.

As in the operation of the classical superregenerative amplifier, the transient trains of radio frequency oscillations shown in FIG. 8 illustrate the linear mode of operation with no signal present. If the present invention is operated in the logarithmic mode, the general shape of the envelope of the transients of radio frequency oscillations would be as represented in FIG. 9. With a signal voltage present, the envelopes in both FIGURES 8 and 9 would be modified as indicated in the dotted outline.

The circuit configuration of blocks 10 and 11 of FIG. 3 can be utilized in any suitable signal translation system for the purpose of amplifying a signal voltage which may be coupled into the resonant tank circuit by means of an input coupling coil 25. The output can be taken off at terminals 27. If it is desired to use the circuit configuration of blocks 10 and 11, merely as an amplifier, the output from terminals 27 may be supplied to any desirable additional amplifier or translation system component. On the other hand, the intelligence in the amplified signal envelope may be recovered by any suitable rectifier device, such as a diode 31 and the output may be supplied to a utilization device, such as headphones 32. A suitable condenser 33 is connected in shunt with the headphones 32 to bypass any high frequency alternating current component which may be present.

It will be readily apparent that by the present invention, a simple and inexpensive amplifier and signal translation system is provided which requires a minimum of power and which can be made into a very compact unit. Any device having a negative region of conductance in its conductance characteristic curve may be used to accomplish the results attained by the illustrated embodiment utilizing the new so-called tunnel diode. Because the tunnel diode inherently has a low noise threshold the signal-to-noise ratio of the amplifier provided by the present invention which, for want of a better term, will be called a resonating amplifier, will be higher than, as well as more efficient than, the classical superregenerative amplifiers of the prior art using electron discharge devices. It is primarily because the tunnel diode is a two terminal device and has the unique operating characteristics that it is possible to provide the relaxation oscillator which is capable of periodically swinging the bias voltage across the operating characteristic range in order to provide the unique resonating amplifier and receiver in accordance with the present invention.

While the invention has been shown in but one form, which incidentally can be operated in the two modes described, to give two different types of operation, it will be obvious to those skilled in the art that it is not so limited to the single form, but is susceptible of various changes and modifications without departing from the spirit of the invention.

We claim as our invention:

1. A signal translating circuit operative with a source of operating potential comprising, a relaxation oscillator operative to oscillate in a relaxation mode, said relaxation oscillator including a tunnel diode having negative and positive conductance regions and inductance means, said tunnel diode, said inductance means and said source being serially connected to sustain relaxation oscillations; and a resonant tuned circuit operatively connected to said tunnel diode to be responsive to changes in the conductance of said tunnel diode to be rendered oscillatory when said tunnel diode changes from operation in a negative conductance region to a positive conductance region and non-oscillatory when said tunnel diode changes from operation in a negative conductance region to a positive conductance region.

2. A resonating amplifier operative with a source of operating potential comprising, a relaxation oscillator operative to oscillate in a relaxation mode, said relaxation oscillator including a tunnel diode having negative and positive conductance regions and inductance means, said tunnel diode, said inductance means and said source being serially connected to sustain relaxation oscillations; and a high frequency oscillator operatively connected to said relaxation oscillator, said high frequency oscillator including a resonant tuned circuit operatively connected to said tunnel diode to be responsive to changes in the conductance of said tunnel diode, said high frequency oscillator being driven into and out of oscillation at the tuned frequency of said resonant tuned circuit in response to said tunnel diode being rendered operative sequentially over its positive and negative conductance regions in the relaxation mode, said inductive means having a high impedance to the high frequency oscillations of said high frequency oscillator to isolate said relaxation oscillator from said high frequency oscillator.

3. A resonating amplifier operative with a source of operating potential comprising, a relaxation oscillator operative to oscillate in a relaxation mode, said relaxation oscillator including a tunnel diode having negative and positive conductance regions and inductance means, said tunnel diode, said inductance means and said source being serially connected to sustain relaxation oscillations; and a high frequency oscillator operatively connected to said relaxation oscillator, said high frequency oscillator including a resonant tuned circuit operatively connected to said tunnel diode to be responsive to changes in the conductance of said tunnel diode and capacitive means operatively connected to said tunnel diode across said relaxation oscillator, said high frequency oscillator being driven into and out of oscillation at the tuned frequency of said resonant tuned circuit in response to said tunnel diode being rendered operative sequentially over its positive and negative conductance regions in the relaxation mode, said inductive means having a high impedance to the high frequency oscillations of said high frequency oscillator to isolate said relaxation oscillator therefrom and said capacitive means having a relatively small impedance at the frequency of the high frequency oscillations.

4. A signal translating circuit operative with a source of operating potential comprising, a relaxation oscillator operative to oscillate in a relaxation mode, said relaxation oscillator including a tunnel diode having negative and positive conductance regions and inductance means, said tunnel diode, said inductance means and said source being serially connected to sustain relaxation oscillations; a high frequency oscillator operatively connected to said relaxation oscillator, said high frequency oscillator including a resonant tuned circuit operatively connected to said tunnel diode to be responsive to changes in the conductance of said tunnel diode; and signal input means operatively connected to said high frequency oscillator to supply signals thereto to be translated, said high frequency oscillator being driven into and out of oscillation at the tuned frequency of said resonant tuned circuit in response to said tunnel diode being rendered operative sequentially over its positive and negative conductance regions.

5. A signal translating circuit operative with a source of operating potential comprising, a relaxation oscillator operative to oscillate in a relaxation mode, said relaxation oscillator including a tunnel diode having negative and positive conductance regions and inductance means, said tunnel diode, said inductance means and said source being serially connected to sustain relaxation oscillations; a high frequency oscillator operatively connected to said relaxation oscillator, said high frequency oscillator including a resonant tuned circuit operatively connected to said tunnel diode to be responsive to changes in the conductance of said tunnel diode; signal input means operatively connected to said high frequency oscillator to supply signals thereto to be translated, said high frequency oscillator being driven into and out of oscillation at the tuned frequency of said resonant tuned circuit in response to said tunnel diode being rendered operative sequentially over its positive and negative conductance regions in the relaxation mode; and signal detecting means operatively connected to said high frequency oscillator to detect said signals being translated.

References Cited by the Examiner

UNITED STATES PATENTS

| | | | |
|---|---|---|---|
| 3,040,267 | 6/1962 | Seidel. | |
| 3,051,846 | 8/1962 | Schott ____________ | 333—80 X |
| 3,069,564 | 12/1962 | De Lange. | |
| 3,081,436 | 3/1963 | Watters. | |
| 3,117,281 | 1/1964 | Rhodes __________ | 331—107 X |

OTHER REFERENCES

Article by Skalski et al. "Results Obtained With Tunnel-Diode Superregenerative Receivers," published as correspondence in the Proceedings of the IRE, February 1962, pages 215–216.

Article by Bradley, "Superregenerative Detection Theory," published in "Electronics," September, 1948, pages 96–98.

ROY LAKE, *Primary Examiner.*

NATHAN KAUFMAN, *Examiner.*